(12) United States Patent
Presnell

(10) Patent No.: US 6,389,733 B1
(45) Date of Patent: May 21, 2002

(54) COLLAPSIBLE AND TELESCOPING FISHING NET

(76) Inventor: C. Rod Presnell, 8957 Winged Four Dr., Tallahassee, FL (US) 32312

(*) Notice: Subject to any disclaimer, the term of this patent is extended or adjusted under 35 U.S.C. 154(b) by 0 days.

(21) Appl. No.: 09/863,358

(22) Filed: May 21, 2001

(51) Int. Cl.[7] ............................................. A01K 77/00
(52) U.S. Cl. ........................................................ 43/12
(58) Field of Search ........................................ 43/7, 12

(56) References Cited

U.S. PATENT DOCUMENTS

| | | | |
|---|---|---|---|
| 440,568 A | * 11/1890 | Hebard | ............ 43/12 |
| 1,169,311 A | 1/1916 | Walter | |
| 2,556,650 A | * 6/1951 | Hick et al. | ............ 43/12 |
| 2,619,755 A | * 12/1952 | Henson | ............ 43/12 |
| 2,620,585 A | * 12/1952 | Delcey | ............ 43/12 |
| 2,630,646 A | * 3/1953 | Jensen et al. | ............ 43/12 |
| 2,727,328 A | * 12/1955 | Dunton | ............ 43/12 |
| 2,738,608 A | * 3/1956 | Buzzini | ............ 43/12 |
| 2,772,502 A | * 12/1956 | Norris | ............ 43/12 |
| 3,032,908 A | * 5/1962 | Chen et al. | ............ 43/12 |
| 3,167,878 A | 2/1965 | Daffron | |
| 3,815,272 A | 6/1974 | Marleau | |
| 4,138,790 A | 2/1979 | Schmucker | |
| 4,870,773 A | 10/1989 | Schmucker et al. | |
| 5,471,778 A | * 12/1995 | Marfori | ............ 43/12 |
| 5,497,580 A | * 3/1996 | Vanderplaats | ............ 43/12 |
| 6,260,302 B1 | * 7/2001 | Blaschke | ............ 43/12 |

* cited by examiner

*Primary Examiner*—Thomas Price, Jr.
(74) *Attorney, Agent, or Firm*—Brian D. Bellamy (57) ABSTRACT

A collapsible and telescoping finishing net assembly having a tubular handle member with a net support frame slidably received within the handle from an internal retracted position to an external deployed position. The net support has a first arm member and a second arm member that are substantially flat and rectangular shaped and include stiffening members providing progressively increased stiffness nearer the upper and lower ends of the arm members. A plug is situated within the handle and slides lengthwise within the handle. The arm members are pivotally connected together at their upper distal ends and are pivotally connected at their lower proximal ends to the plug. A locking mechanism biased tension members hold the arm members in rigid alignment at their upper ends when the net support is in the external deployed position. A net is attached to the net support by looping the net about eyelets that are molded into the arm members. When the assembly is deployed, the net can be used to capture fish.

8 Claims, 7 Drawing Sheets

COLLAPSIBLE AND TELESCOPING FISHING NET

BACKGROUND OF THE INVENTION

The present invention relates to a collapsible and telescoping fishing net for use in the sport of angling when landing a fish. More particularly, the invention relates to an assembly of a fishing net that collapses and stores within the net's handle that can be conveniently telescoped and deployed by rapidly extracting the net from the handle and locking the net into an open or expanded position.

Fishing nets are widely utilized as auxiliary equipment by fishermen in order to capture and land a fish caught on a hook. Fishing nets are particularly useful for wading fisherman and highly desirable for one fishing from a bank or a boat. Many times the problem for a fisherman is to produce an operable fishing net while suddenly encountering a fish and having a simultaneous need to reel in the fish and apply tension to a fishing line. While holding a pole and line that is hooked to a fish, a fisherman is relegated to having no more than one hand available for operation of a fishing net. For a long while, nets suited for one hand operation have been available as an elongated rigid handle carrying at one end a permanently affixed loop frame holding a net.

However, such nets with the frame mounting the net fixed to and as a permanent extension from the handle are inconvenient because the complete unit has considerable length and is difficult to transport by the angler in association with other equipment. Further, the exposed net is prone to snag and catch in the natural obstacles associated with boating, wading, and fishing.

Many fish nets have been designed before with handles and nets condensed, yet with features to help provide for a quick change of the condensed net to one which is operational. U.S. Pat. No. 3,512,291 describes a landing net wherein the net and its frame can be easily collapsed. U.S. Pat. No. 3,815,272 describes a fish net that can be collapsed and stored in the net handle after some substantial manipulation of the net and frame. U.S. Pat. No. 4,050,177 describes a fish net and frame that is collapsible and storable in the handle by a combination of telescoping and folding the frame and net. U.S. Pat. No. 4,138,790 describes a fish net with a frame and a handle wherein the fish net and frame collapse and pivot into a more compact assembly. U.S. Pat. No. 4,207,700 describes a fish net, frame, and handle that can be collapsed and telescoped into the handle, but is not easily manipulated from the collapsed condition to the operational position and back again. U.S. Pat. No. 4,870,773 describes a fish net, frame, and handle that can be collapsed by folding and telescoping of the frame, but does not provide a cover for the stored net. U.S. Pat. No. 3,167,878 describes a fish net, arms, and handle that can be collapsed into the handle by manually compressing the arms, while the arms normally produce a curvature to provide a widely-open net frame. U.S. Pat. No. 1,169,311 describes a fish net, a three-section frame, and handle that can be collapsed and telescoped into the handle, but requires the time consuming assembly of several frame sections to make the fish net operable. Although these patents disclose handles and nets designed to be condensed, none of the prior art patents teaches the combination of a readily collapsible fish net assembly stored within a handle that may be rapidly deployed using one-hand to manipulate the device while still providing a device that is very sturdy, durable, and economically viable to construct.

It is an object of the present invention to provide a novel fishing net assembly that is suitable for use by anglers in various fishing settings having a net supporting frame is collapsible so that the net is conveniently stored and does not snag or tangle while not in use. Said object is accomplished through further objects of providing a fishing net assembly that is subject to manipulation by one-hand to deploy the net for landing a fish. Another object is to provide such fishing net that is very sturdy and durable, yet economical to produce. Still other objects will be apparent from the more detailed description of the invention which follows.

BRIEF SUMMARY OF THE INVENTION

The invention comprises a collapsible and telescoping fishing net which includes a rectangular or square tubular member and a first arm member and a second arm member supporting a net pouch. The net pouch is retained on the arms by a plurality of eyelets and posts provided in the arm members. The arm members are pivotally attached to a slidable plug such that the plug, arm members and net pouch may slide into the tubular member for storage of the fishing net. The fishing net may be deployed by latch button release and sliding the tubular member so that the arms are extended outwardly. At the opposite end of the plug, the arm members are joined together by pivot pin and a locking pin is retained in a slot on the first arm member in tension with respect to the second arm member such that when the fishing net is deployed the locking pin engages a slot on the second arm member to lock the arms into place in an oval looped configuration for landing fish. The shape and sturdiness of the fishing net is improved by the design of the arms in a rectangular shape having a pair of sloping flanges on the interior surface edges of each arm. The sloping flanges rise from the mid-sections of the arms to terminate at each end of the arms such that the arms and flanges are widest at the ends of the arms, thus making the arms very sturdy despite the advantage of being constructed of inexpensive material. The flange disappears at about the mid-section of the arms to allow the arms to easily bend to take the oval looped shape desirable for supporting a fishing net and landing fish.

DETAILED DESCRIPTION OF THE INVENTION

Figure 1:
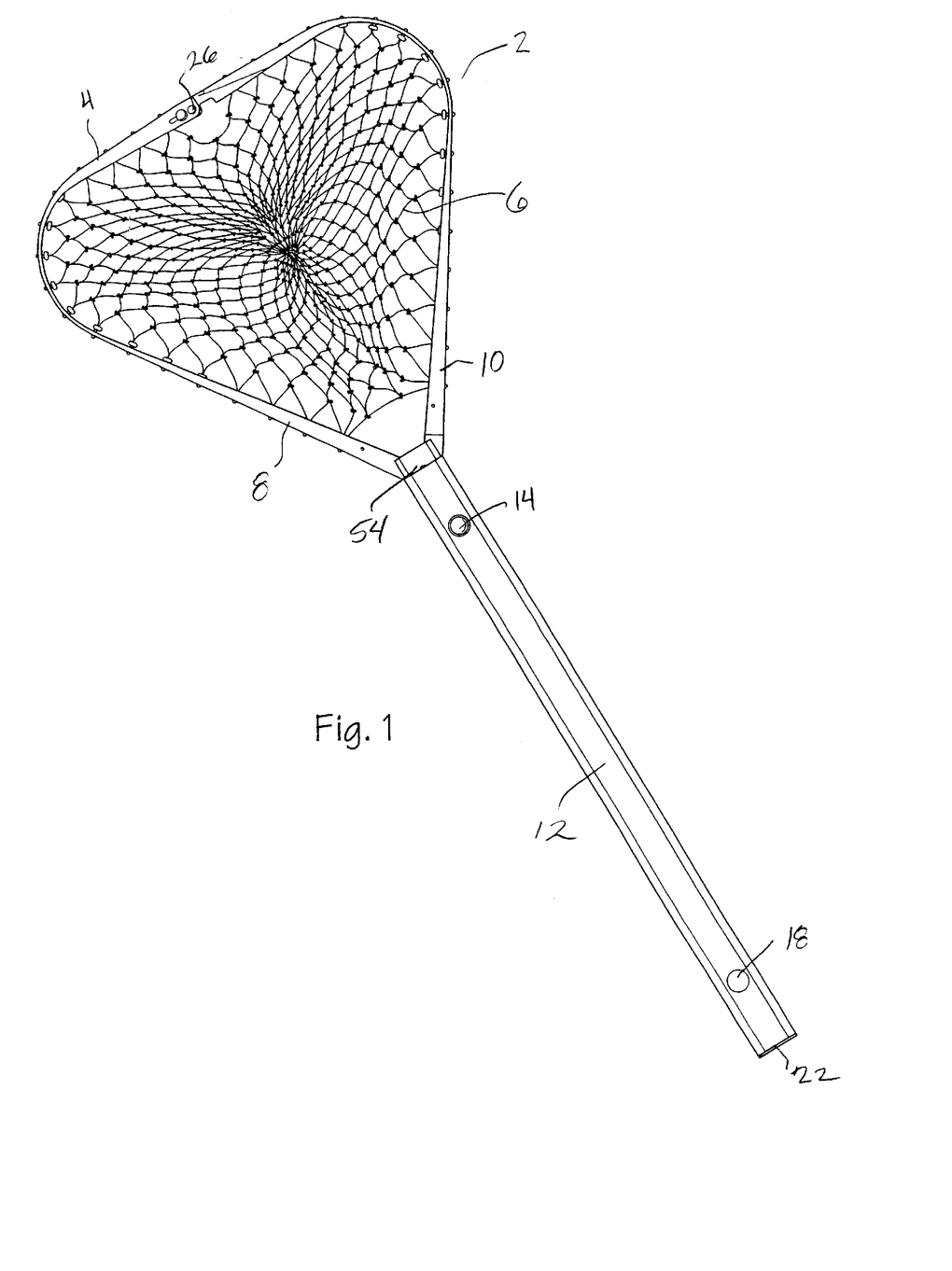
FIG. 1 is a top plan view of a collapsible and telescoping fishing net, according to the present invention, in a telescoped or fully expanded position.
Figure 2:
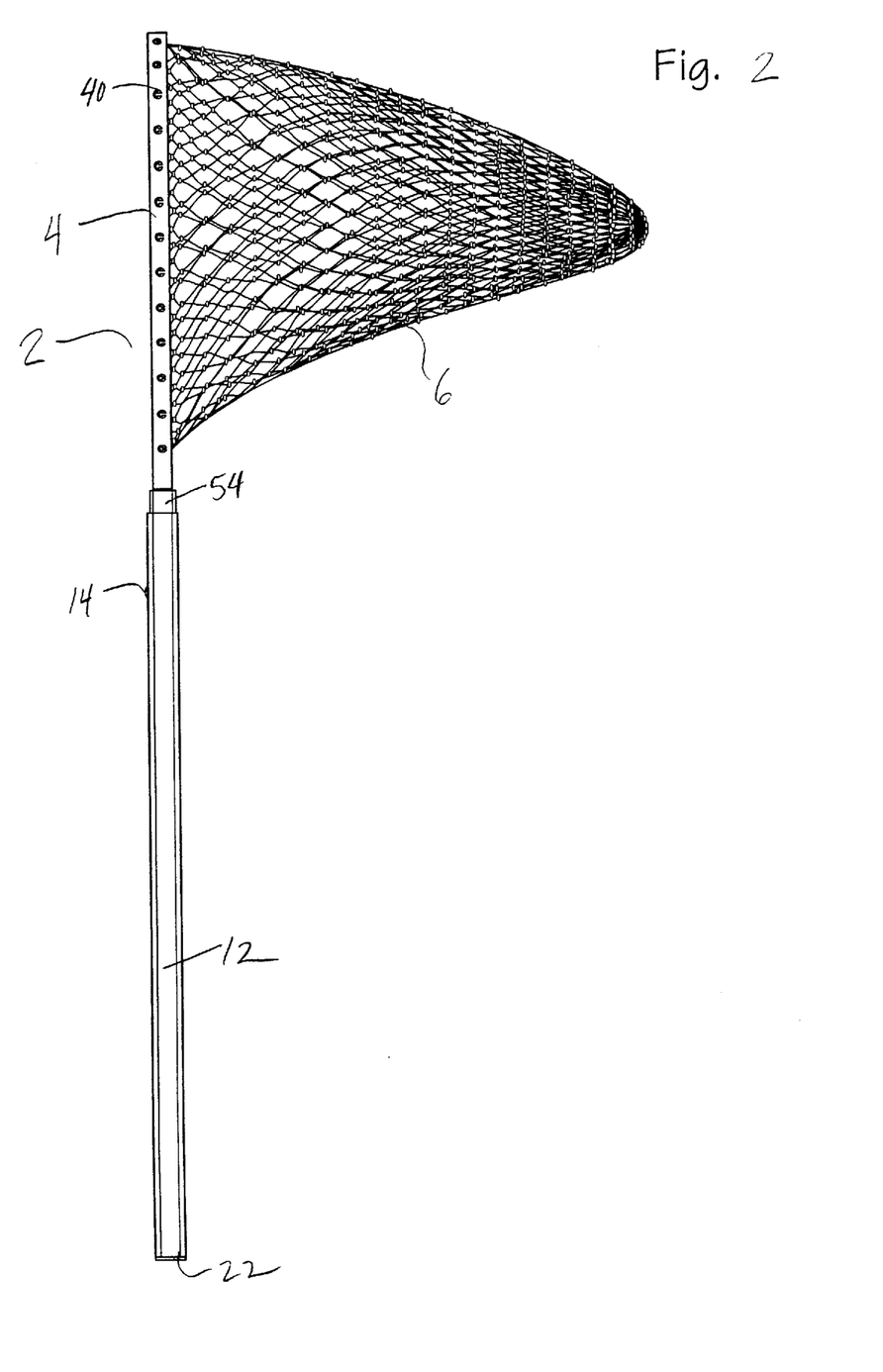
FIG. 2 is a side plan view of the fishing net in a telescoped position.

Referring now to the drawings, an embodiment of a fishing net is illustrated that is constructed in accordance with the teachings of the present invention. In FIG. 1 there is shown a fishing net assembly 2 that is telescoped having an expanded looped net support 4 holding a net 6 for landing fish. The net 6 attaches to the net support 4 of the fishing net assembly 2 which includes a first arm member 8 and a second arm member 10 that expand to form the net support 4. When the fishing net assembly 2 is deployed for landing a fish, the net 6 appears as shown in FIG. 2.

Figure 3:
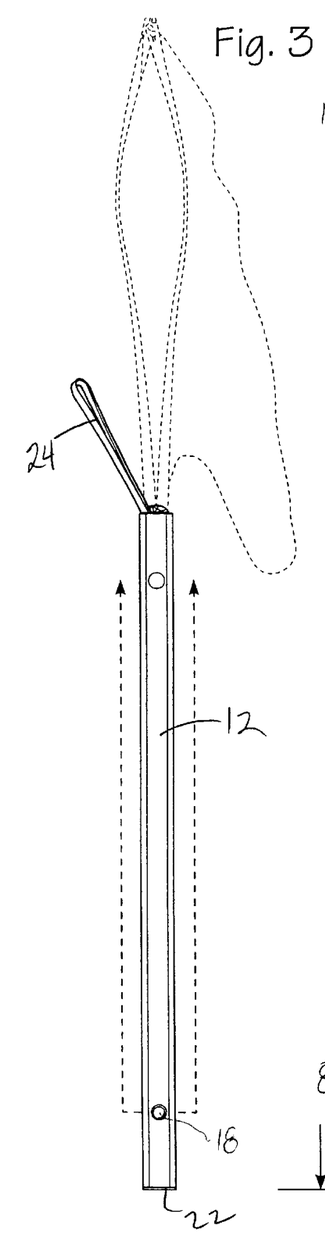
FIG. 3 is a top plan view of the fishing net in a fully collapsed position.

The fishing net assembly 2 includes a tubular handle member 12 into which the arm members 8 and 10 are collapsible. The tubular structure of the handle member 12 is of such size and shape to permit the arm members 8 and 10 to retract into an internal position within the interior of the handle member 12 when the arm members 8 and 10 are collapsed. As shown in FIG. 3, the collapsed arm members 8 and 10 and net 6 can slide completely into the handle member 12 until a latch button 14 powered by a spring 16 may engage a first latch aperture 18 on the handle member 12. The handle member 12 may be closed at its bottom end by a cap 22 or plug. A lanyard 24 attaches to the end of the collapsed arm members 8 and 10 and hangs out of the upper end of the handle member 12 while the arm members 8 and 10 are retracted.

Figures 4, 5:
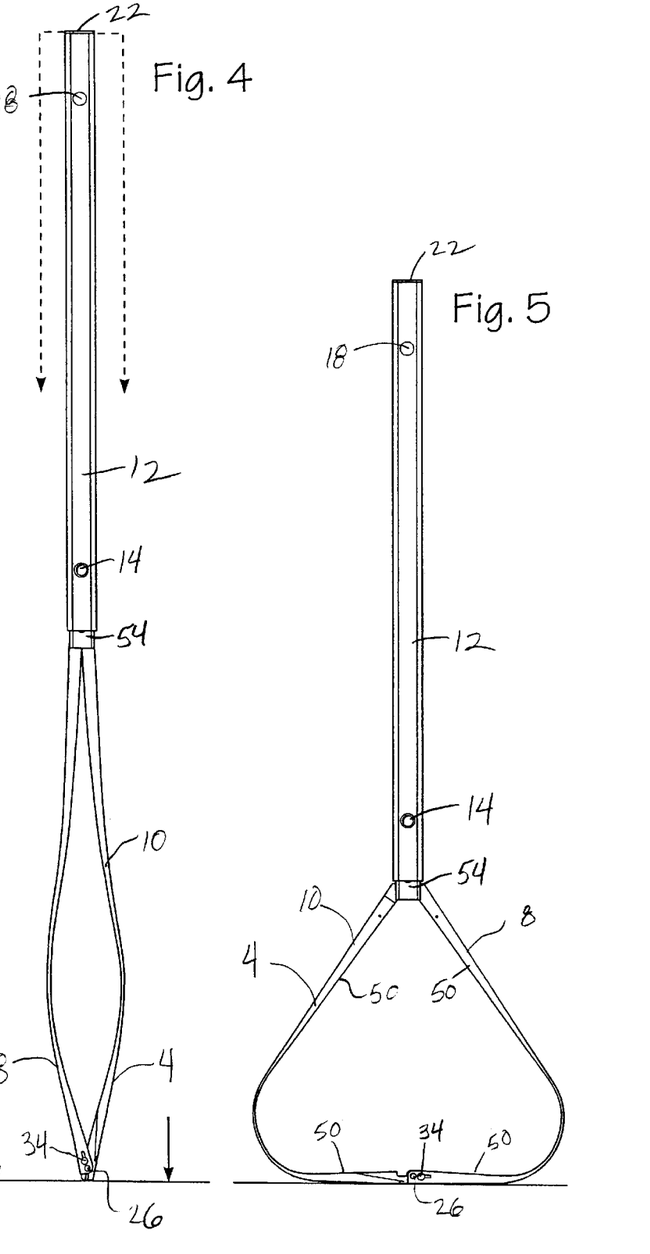
FIG. 4 is a top plan view of the fishing net in a telescoped position, but partially collapsed.
FIG. 5 is a top plan view of the fishing net in a telescoped and fully expanded position after applying downward force to the fishing net in the partially collapsed position as shown in FIG. 4.
Figure 6A:
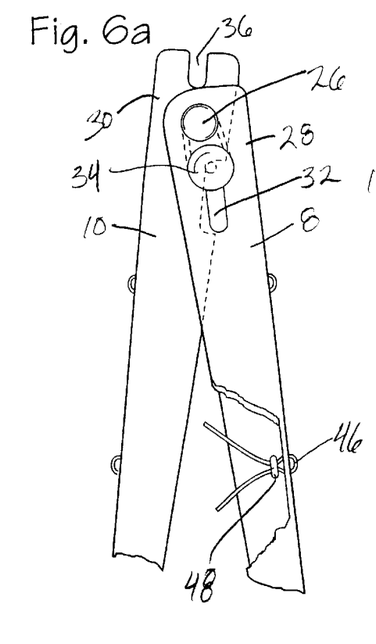
FIG. 6a is a cut-away top plan view of the locking pin assembly with the arms of the fishing net collapsed.
Figure 6B:
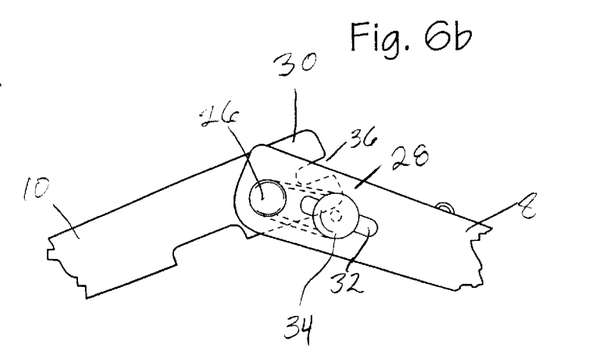
FIG. 6b is a cut-away top plan view of the locking pin assembly with the arms partially expanded.
Figure 6C:
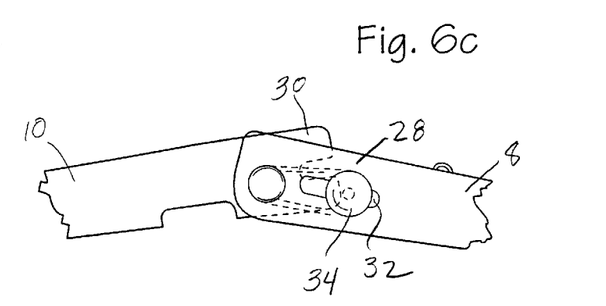
FIG. 6c is a cut-away top plan view of the locking pin assembly with the arms further partially expanded.
Figure 6D:
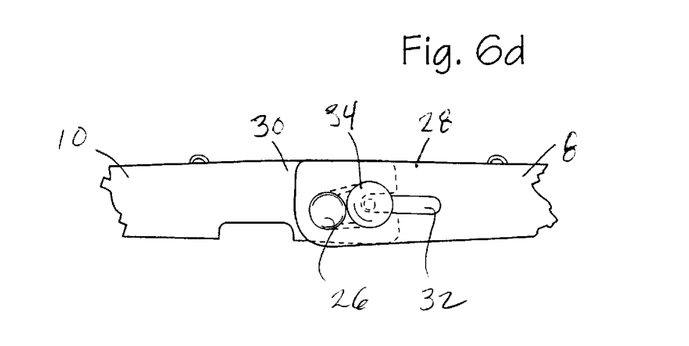
FIG. 6d is a cut-away top plan view of the locking pin assembly with the arms completely expanded and the locking pin engaged.

When ready for deployment of the fishing net assembly 2, the combination of the arm members 8 and 10 comprising the net support 4 and the net 6 is pulled axially out of the handle member 12 to an external position until the latch button 14 engages a second latch aperture 20 on the handle member 12. The entire process of deploying the fishing net assembly 2 maybe carried out by one hand. First, the extraction of the arm members 8 and 10 is completed by holding the lanyard 24 with a foot and pulling the handle member 12. Then, when the arm members 8 and 10 are completely free of the handle member 12 and the latch button 14 is engaged, the ends of the extended arm members 8 and 10 may be pressed against a fixed surface as shown in FIG. 4 using one hand. Pressing the extended arm members 8 and 10 causes the arm members to begin to deflect to form the looped net support 4. As shown in FIG. 5, continued pressing to cause the arm members 8 and 10 to deflect results in the formation of the net support 4 into the desired triangular or elliptical looped shape. The entire process of deploying the fishing net assembly 2 is very simple and may be carried out very rapidly to lock the net support 4 into the circular-elliptical looped shape.

Figure 8:
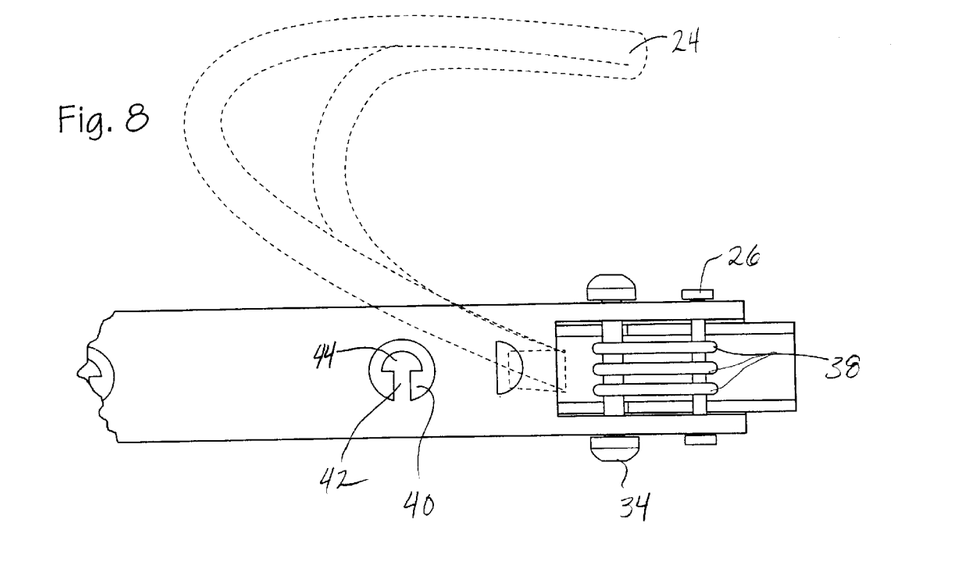
FIG. 8 is an enlarged cut-away end plan view of the locking pin assembly, lanyard, and eyelet.

FIGS. 6a, 6b, 6c, and 6d illustrate in enhanced detail the mechanism for locking the net support 4 into the looped shape. The first arm member 8 and second arm member 10 are pivotally connected at their upper ends by a first pivot device 26, illustrated by a pin member. Each arm member 8 and 10 has a right angle tab 28 and 30 on the upper end of the arm member which forms a location for joining the two arms 8 and 10 by the pivot device 26. Also, within the right angle tab 28 on the first arm member 8, the tab 28 includes a closed slot 32 having a locking mechanism 34, embodied by a locking pin, slidably retained therein. Within the right angle tab 30 on the second arm member 10, the tab 30 includes an open slot 36 with an open end for receiving the locking pin 34 when the arm members 8 and 10 are expanded to form the looped net support 4. As the arm members 8 and 10 are deflected, the locking pin 34 moves about the end of the second arm member 10 and slides within the closed slot 32 until the arm members 8 and 10 are deflected to the point that the locking pin 34 engages the open end of the open slot 36. One or more biased tension members 38 cause the locking pin 34 to slide into the end of the open slot 36 when engaged. The biased tension members 38 shown in FIG. 8 are several o-rings attached between the pivot pin 26 and the locking pin 34 such that the o-rings are stretched to cause a bias and pull the locking pin 34 into the open slot on the second arm member tab 30. When the locking pin 34 engages the open slot 36 of the second arm member 10, the first arm member 8 and second arm member 10 are locked into position such that the arm members' upper ends abut, and the arm members 8 and 10 remain deflected to form the looped net support 4 for holding a net 6 useful in landing fish. The locking pin 34 may be disengaged by pressing the arm members 8 and 10 of the net support 4 toward the handle member 12 to diminish the bias of the tension members 38 and loosen the locking pin 34 to allow the locking pin to slide out of the open slot 36.

Figures 9, 10:
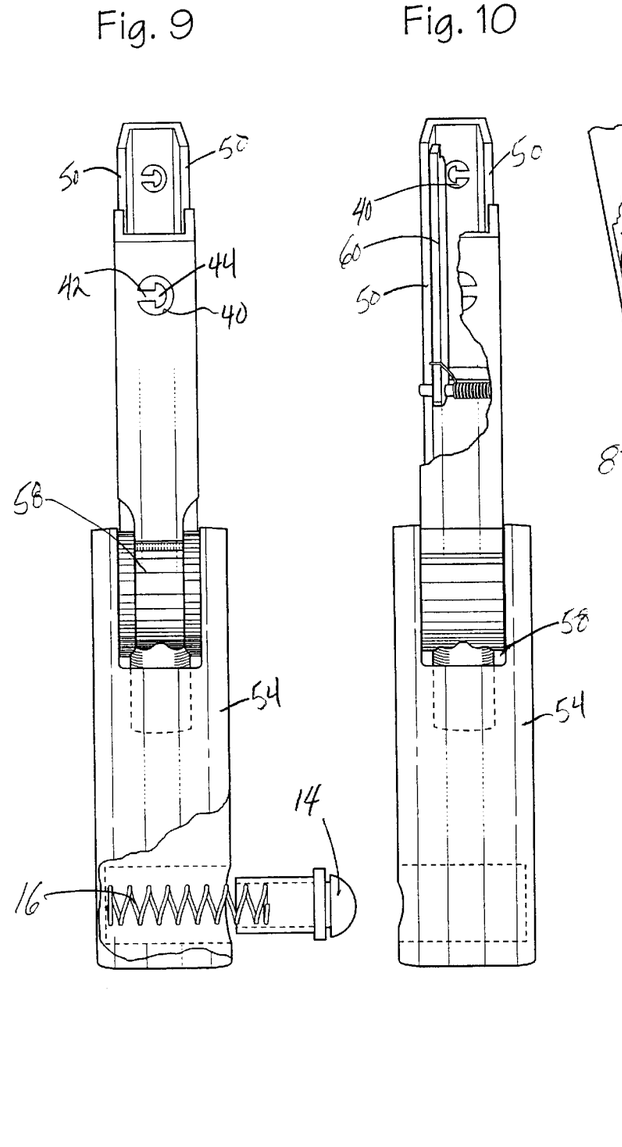
FIG. 9 is a cut-away and cross-sectional side plan view of the plug, hinge, and latch button assembly.
FIG. 10 is a cut-away and cross-sectional side plan view of the plug, hinge, and support member assembly.

Each arm member 8 and 10 is flat and rectangular which has been found to make the net support 4 sturdy and rigid when opened. The flat rectangular shape allows construction of the arm members 8 and 10 from inexpensive plastics without overly complex molds, while permitting the molding of integral eyelets 40 into the arm members 8 and 10 for attaching and supporting the net 6. A plurality of eyelets 40 are molded into the arm members 8 and 10 by cutting out small apertures from the rectangular arm members and leaving one or more small posts 42 attached to the rectangular arm members within each aperture. As shown in FIGS. 8 and 9, the posts 42 may each include a mushroom shaped head portion 44 or other retaining element for retaining a net loop 46 on the post 42. The net loops 46 may be shortened and secured to the posts 42 by slip rings 48. The molded construction of the posts 42 in the arm members 8 and 10 provides for hanging the net 6 onto net support 4 without further need for means to retain the net 6.

Figure 7:
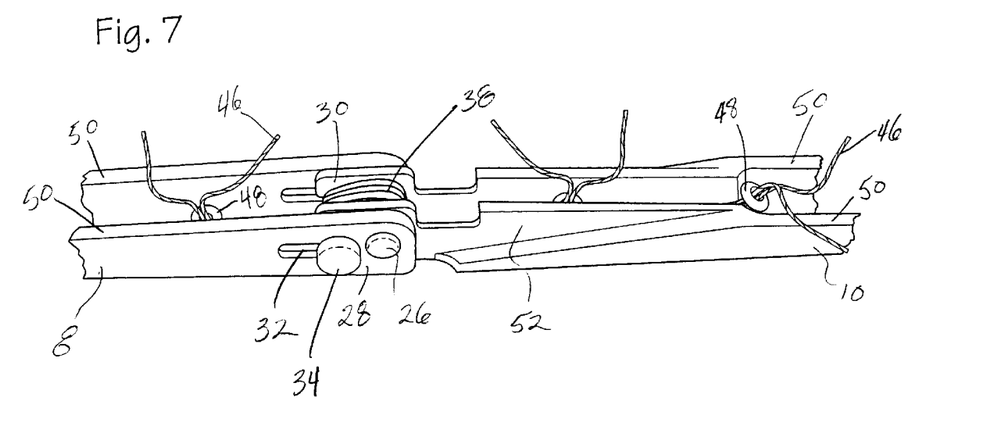
FIG. 7 is a cut-away bottom perspective view of a portion of the fishing net whose arms are completely expanded and the locking pin engaged.

Each of the arm members 8 and 10 includes a stiff portion and a flexible portion that aid in forming the shape of the looped net support 4 and make the fishing net assembly easy to deploy without need for application of much force to deflect the arm members 8 and 10. The stiff portions of the arm members 8 and 10 may be formed by increasingly wide tapered flanges 50 having a point of beginning near the mid-section of each arm member 8 and 10. Although a single flange or other stiffening member could alternatively be substituted, in the embodiment depicted, one flange 50 is situated on each edge of the arm members 8 and 10. The flanges 50 are situated on the inwardly facing flat surfaces of the arm members 8 and 10 and at right angles thereto, and the flanges 50 taper in increasing width to form an increasingly deep groove on the inwardly facing surfaces of the arm members 8 and 10. The flanges 50 terminate near the ends of the arm members 8 and 10. Thus, this permits a stiffer support near the ends of the arm members 8 and 10 and near the proximal connections shown in FIGS. 1, 4, and 5. Further, the tapered flanges 50 permit a more flexible section near the mid-sections of the arm members 8 and 10 to permit bending of the arm members 8 and 10 into a circular-elliptical shaped net support 4 as shown in FIGS. 1 and 5. The girth and actual circular-elliptical shape of the looped net support 4 is determined in part by the location and the width of the flanges 50 which cause the increased stiffness of the arm members 8 and 10 near their ends. The flanges 50 may be modified with features such as a cut away portion 52, as shown in FIG. 7, to enhance the operation of the fishing net assembly 2 in telescoping, collapsing, and retracting into the handle member 12. In particular, the cut away portion 52 permits the arm members 8 and 10 to fold into an parallel contiguous relationship for retracting into the handle member 12.

The lower ends of the arm members 8 and 10 are attached to a plug 54 which slides lengthwise into the tubular handle member 12 and does not turn about the lengthwise axis of the handle member 12. This is accomplished by making the handle member 12 and plug 54 with a non-circular transverse cross-section, e.g., elliptical, triangular, square, splined or other non-rotatable shapes. The plug 54 may be similarly shaped to the handle member 12 or otherwise configured to prevent turning radially about the lengthwise axis.

The plug 54 contains the spring biased latch button 14 discussed previously which is able to engage the latch apertures 18 and 20 in the handle member 12 when properly aligned. The latch apertures 18 and 20 allow the latch button 14 to slide outwardly from its inward position to its outward extension. When the latch button 14 is in its extended position, the latch button 14 may secure the plug 54 into position as indexed by the latch apertures 18 and 20 such that the plug 54 cannot move to retract or telescope.

Figure 11:
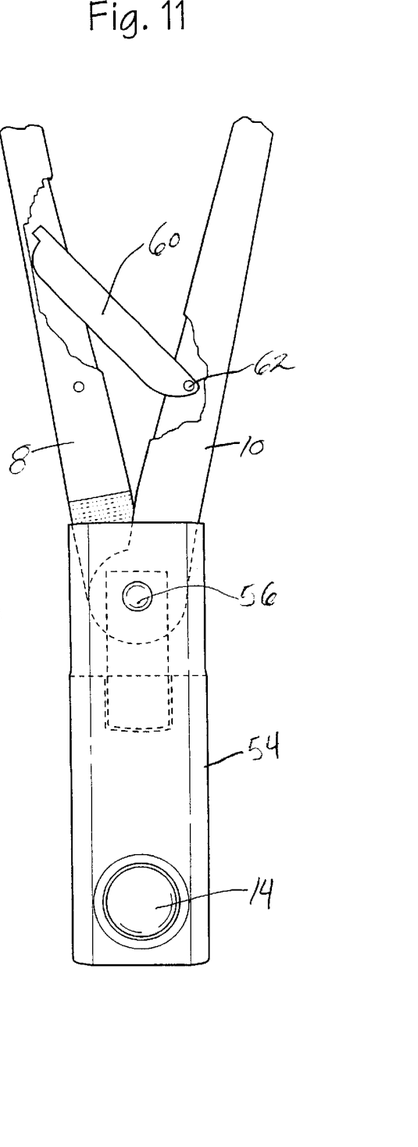
FIG. 11 is a cut-away and cross-sectional top plan view of the plug, hinge, and support member assembly with the fishing net partially expanded.
Figures 12, 13:
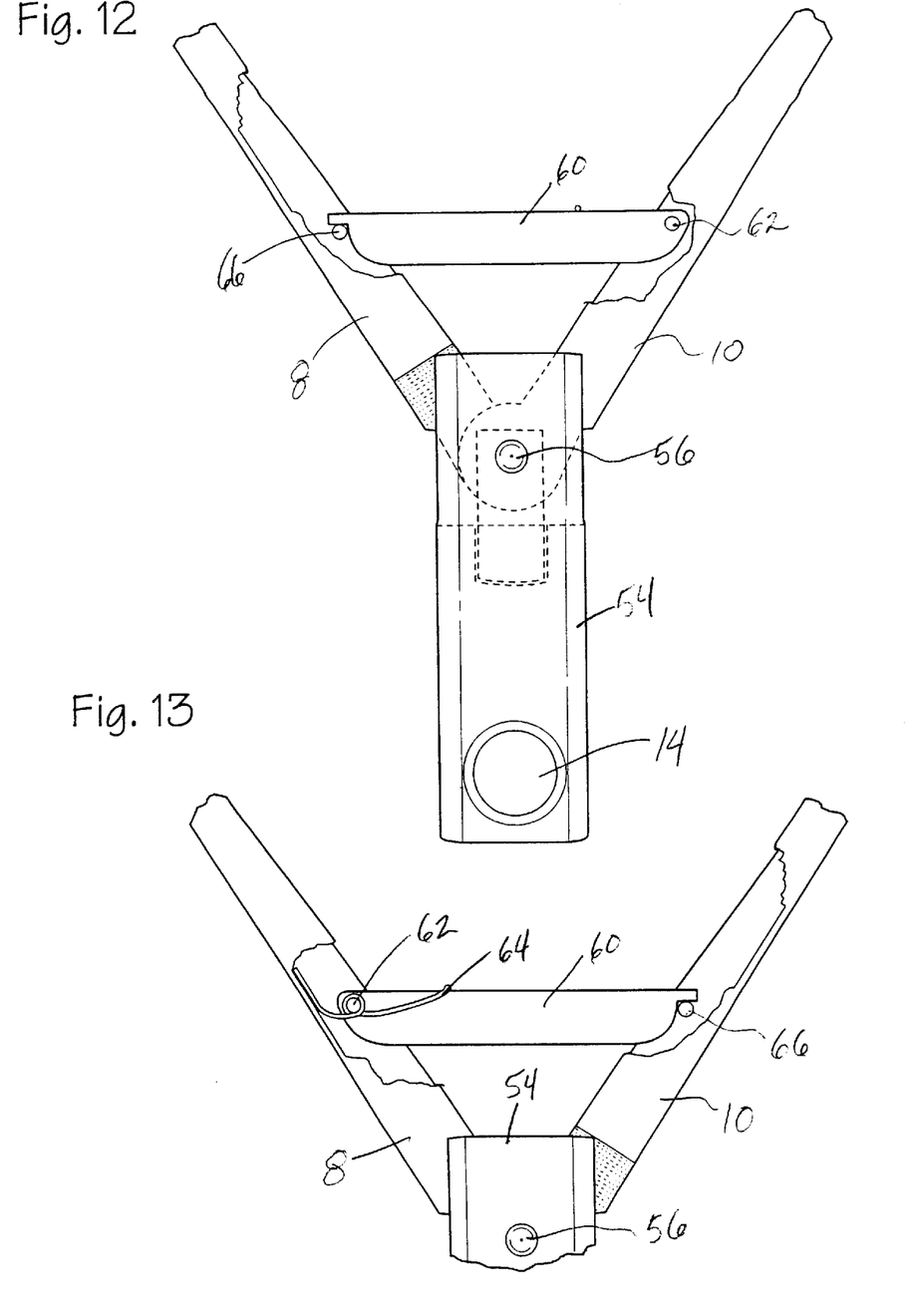
FIG. 12 is a cut-away and cross-sectional top plan view of the plug, hinge, and support member assembly with the fishing net completely expanded.
FIG. 13 is a cut-away and cross-sectional bottom plan view of the plug and support member assembly with the fishing net completely expanded.

When the arm members 8 and 10 are completely telescoped as indexed by the latch button 14, the plug 54 is positioned with its upper surface above the upper edges of the handle member 12. The arm members 8 and 10 are pivotally attached at their lower ends to the plug 54 by a second pivot device 56 exemplified by the pivot pin shown in FIGS. 11, 12, and 13. In this position the second pivot device 56 is situated with respect to the upper edges of the handle member 12 such that each arm member 8 and 10 may pivot about the second pivot device 56 to cause the arm members 8 and 10 to spread apart as shown in FIGS. 1 and 5. The single pivot pin 56 joins the connecting arm members 8 and 10 at their lower ends in a construction that is simple to construct and cost effective. Nonetheless, the arm members 8 and 10 may be separately pivotally connected to the plug 54 without having the arm members 8 and 10 adjoin at their lower ends. Grooves 58 are shown in FIGS. 9 and 10 in a transverse direction in order to facilitate the interconnection of the arm members 8 and 10 to the second pivot device 56 and the rotation of the arm members 8 and 10 about the second pivot device 56 to spread the arms apart. Once the arm members 8 and 10 are spread apart, a crossbar type support member 60 may be provided for additional reinforcement of the telescoped net support 4. The support member 60 of FIGS. 11, 12, and 13 may attach to one arm member 8 or 10 by a pivot pin 62 and spring 64 and depend on a rest pin 66 when the net support frame 4 is expanded.

In constructing the invention, the handle member 12 may be made of a corrosion resistant metal, plastic, or fiber-glass, and the plug 54 may be made of any material that is compatible with the material of the handle member 12. Such materials may be metal, plastic, fiber-glass or the like. Whereas, the arm members 8 and 10 may be made of any strong corrosion-resistant material that may be configured in accordance with the teachings of the invention and has sufficient flexibility to permit the bending of the arm members 8 and 10 into the desired shape of the looped net support 4. Such material for the arm members 8 and 10 is preferable plastic, but may include stainless steel, titanium, aluminum, fiber-glass, etc.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention as defined by the claims.

I claim:

1. A collapsible and telescoping fishing net assembly comprising:

a. a tubular handle member;

b. a net support having a first arm member and a second arm member, said arm members each having an upper distal end and a lower proximal end; the first and second arm members are substantially flat and rectangular shaped and include stiffening members providing progressively increased stiffness nearer the upper and lower ends of the arm members; said net support is slidably received within the tubular handle member from an internal retracted position to an external deployed position;

c. a plug situated within the tubular handle member and slidable lengthwise of said tubular handle member without radial movement therein;

d. a first pivot device including a pivot pin pivotally connecting the first arm member and second arm member at their upper ends;

e. a locking mechanism holding the first arm member and second arm member in rigid alignment at their upper ends when the net support is in the external deployed position;

f. a second pivot device pivotally connecting the first arm member and second arm member at their lower ends to the plug;

g. a net attached to the net support.

2. A collapsible and telescoping fishing net assembly as claimed in claim 1 in which said stiffening members includes tapered flanges perpendicular disposed on the flat surface of said arm members.

3. A collapsible and telescoping fishing net assembly as claimed in claim 1 in which said locking mechanism includes a right angle tab on the upper end of each arm member; the tab on the first arm member tab includes a closed slot having a locking pin slidably retained within the slot; the tab on the second arm member includes an open slot having an open end for receiving the locking pin when the net support is in the external deployed position; one or more biased tension members are attached between the locking pin and the pivot pin of the first pivot device to pull the locking pin into the open slot when the net support is in the external deployed position.

4. A collapsible and telescoping fishing net assembly as claimed in claim 3 in which said biased tension members are a plurality of stretchable o-rings.

5. A collapsible and telescoping fishing net assembly as claimed in claim 1 in which said plug includes a spring biased latch button which is outwardly extendable into a latch aperture in said tubular handle member when said net support has reached the filly deployed position.

6. A collapsible and telescoping fishing net assembly as claimed in claim 1 in which a crossbar member is attached to an arm member by pivot pin and spring and depend on a rest pin on the opposing arm member when said net support is in the external deployed position.

7. A collapsible and telescoping fishing net assembly as claimed in claim 1 in which said second pivot device includes a pivot pin jointly connecting said first arm member and said second arm member to said plug.

8. A collapsible and telescoping fishing net assembly as claimed in claim 1 in which said net includes net loops and is attached to said net support by hanging the net loops on a plurality of eyelets that are molded into said arm members by providing an aperture that defines a post and retaining element.

* * * * *